US006889346B2

(12) United States Patent
Abdelilah et al.

(10) Patent No.: US 6,889,346 B2
(45) Date of Patent: May 3, 2005

(54) SCOPING OF REAL TIME SIGNALS OF REMOTE COMMUNICATION SYSTEMS OVER A COMPUTER NETWORK: SYSTEMS, METHODS AND PROGRAM PRODUCTS

(75) Inventors: Youssef Abdelilah, Holly Springs, NC (US); Gordon Taylor Davis, Chapel Hill, NC (US); Jeffrey Haskell Derby, Chapel Hill, NC (US); Dongming Hwang, Cary, NC (US); Clark Debs Jeffries, Durham, NC (US); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 09/906,371

(22) Filed: Jul. 16, 2001

(65) Prior Publication Data

US 2003/0014691 A1 Jan. 16, 2003

(51) Int. Cl.$^7$ ............................................. G06F 13/00
(52) U.S. Cl. ............................. 714/46; 714/57; 702/188
(58) Field of Search ................................ 714/4, 18, 25, 714/46, 57; 709/224; 702/188

(56) References Cited

U.S. PATENT DOCUMENTS

| | | | |
|---|---|---|---|
| 4,740,777 A | 4/1988 | Slocum et al. ............... 340/522 |
| 5,228,039 A | 7/1993 | Knoke et al. .................. 371/19 |
| 5,375,288 A | 12/1994 | Leary et al. .................. 395/575 |
| 5,630,049 A | 5/1997 | Cardoza et al. .......... 395/183.01 |
| 5,634,022 A | 5/1997 | Crouse et al. ............... 395/704 |
| 5,736,680 A | 4/1998 | Caldwell et al. ............. 174/250 |
| 5,792,951 A | 8/1998 | Ismail et al. ............. 73/204.11 |
| 5,995,744 A | 11/1999 | Guccione ............... 395/500.44 |
| 6,049,798 A | 4/2000 | Bishop et al. ................. 707/10 |
| 6,067,407 A | * 5/2000 | Wadsworth et al. ......... 709/224 |
| 6,108,782 A | 8/2000 | Fletcher et al. .............. 713/153 |
| 6,165,688 A | 12/2000 | Celotta et al. ............... 430/296 |
| 6,173,325 B1 | * 1/2001 | Kukreja ....................... 709/224 |
| 6,507,923 B1 | * 1/2003 | Wall et al. ................... 714/712 |
| 6,721,687 B2 | * 4/2004 | Bartolome et al. .......... 702/187 |
| 6,721,688 B1 | * 4/2004 | Clarke ........................ 702/188 |

OTHER PUBLICATIONS

U.S. Appl. No. 09/430,097, entitled, "Methods, Systems and Computer Program Products for Monitoring Performance of a Modem During a Connection", filed Oct. 29, 1999 (RAL9–99–0117/4269–90), Y. Abdelilah et al.

U.S. Appl. No. 09/906485, entitled, "Redistribution of Excess Bandwidth in Networks for Optimized Performance of Voice and Data Sessions: Methods, Systems and Program Products," filed (RAL920000103US1/1963–7414), Y. Abdelilah et al.

\* cited by examiner

*Primary Examiner*—Scott Baderman
*Assistant Examiner*—Anne L. Damiano
(74) *Attorney, Agent, or Firm*—Morgan & Finnegan L.L.P.

(57) ABSTRACT

A remote controller is coupled to a target system via a computer network A real time probe is installed in software executing on a target system, typically a Digital Signal Processor (DSP). The remote controller includes a "debugger user interface" which accepts and interprets scoping commands issued by a developer. A controller network driver constructs appropriate network packets to be sent over the network to the target system. The target system has a control processor which runs a target network driver for receiving the network packets containing the scoping commands. The scoping commands are sent to an "embedded debugger" which performs the requested probing/scoping. When the DSP code runs across an address where the probe is installed, the embedded debugger will collect the signal values. The collected scope data will be interleaved and sent to the target network driver which, will encapsulate the information into suitable packets to send back to the controller via the network.

33 Claims, 8 Drawing Sheets

Block Diagram For Remote Scoping System

Scope Command Setup

Iterative Bandwidth Allocation / Down-sampling / Selective Block Sampling

Remote Real Time Scoping Session Flow Chart

Illustration of data samples in packets with Interleaving

Illustration of Big Scope Storage Circular Buffer

SCOPING OF REAL TIME SIGNALS OF REMOTE COMMUNICATION SYSTEMS OVER A COMPUTER NETWORK: SYSTEMS, METHODS AND PROGRAM PRODUCTS

RELATED APPLICATIONS

1) Ser. No. 09/430,097 entitled "Methods, System And Computer Program Products For Monitoring Performance Of A Modem During A Connection" filed Oct. 29, 1999 and 2) Ser. No. 09/906,485 entitled "Redistribution of Excess Bandwidth in Networks for Optimized Performance of Voice and Data Sessions: methods, systems and program products", filed Jul. 16, 2001 both applications assigned to the same assignee as that of the present invention and fully incorporated herein by reference.

BACKGROUND OF INVENTION

1. Field of Invention

This invention relates to digital signal processing, debugging or fault analysis systems, methods, and program products. More particularly, the invention relates to scoping of real time signals of remote communication system over a computer network: systems, methods & program products

2. Description of Prior Art

The communication/data processing software, which runs on today's communication systems, is extremely complicated. Thus, it demands extensive debugging and analysis capabilities such as probing and scoping (graphically displaying) any real time signals/variables inside a digital signal processor (DSP) and/or communication systems. The prior art discloses techniques for probing (scoping) real time signals in DSP/Communication systems without using the traditional logic analyzer. However, the DSP/communication system being analyzed must be locally attached to (or embedded inside) the controller (normally a PC) which the developer uses for debugging and analysis. Due to the worldwide exploding Internet access, these extremely complicated communication systems are widely deployed all over the world. When problems arise in the field, it's very likely that the problems may only be reproducible at a specific location due to the specific transmission line/system condition, which cause the problems. Traditionally, a developer will have to travel physically to the location to do the analysis when such line/system dependent problems arise.

What is needed in the art is a technique for performing scoping of real time signals of remote communication systems over a computer network. Such scoping should allow the code developer to do extensive real time diagnostics on any remote target communication system worldwide without the need of travelling to the physical location. Remote scoping is extremely valuable for resolving complicated field problems. A real time software scope can be activated remotely by putting a real time probe into a location in the DSP code on the target system. The developer can view the graphic display of the signals remotely in real time with the target system in normal operation.

Prior art related to remote scoping of communication systems includes:

U.S. Pat. No. 5,634,022 issued May 27, 1997 discloses a multi-media computer diagnostic system for fault isolation in a multi-tasking hard, real-time task environment. Hard, real-time multi-tasking operations, particularly those unique to signal processing tasks may be monitored without creating a task processing overload and without delaying the results beyond hard, real-time task deadlines by insertion of a branch instruction in the task execution instructions being examined which cause execution of the task to branch to a diagnostic program. The diagnostic program executes a diagnostic instruction set and captures one or more digital samples characteristic of the operation of the hard, real-time task at the point in its program execution where the branch instruction was located. The digital data samples so obtained may be queued and graphically plotted on the screen of a display associated with the computer system to generate a graphical representation of the performance of the algorithm or signal processing task under examination in order to quickly isolate task malfunctions without having to review a mass of digital data samples. Alternatively, pre-selected samples may be injected into the task execution by loading task registers with predetermined data by executing a branch to a diagnostic function, which inserts the samples.

U.S. Pat. No. 5,630,049 issued May 13, 1997 discloses a method of remote debugging comprises a first computer system that communicates with a second computer using a network connection. The first computer system controls the remote debugging and comprises a first operating system. The second computer system comprises a second operating system and software being tested. User input, in the form of debug commands, is received using a remote debugger in the first computer system to control the remote debugging session. The remote debugger translates a debug command into messages that are sent from the first computer system to the second computer system. The messages correspond to tasks that the target computer system performs to complete the debug command. During debugging, the target computer system transitions between polling or stopped mode and interrupt-driven mode by transitioning both the target operating system and network hardware in the target computer system that interfaces with the network U.S. Pat. No. 5,228,039 issued Jul. 13, 1993 discloses a source-level run-time software code debugging instrument includes a target access probe (TAP) and a communications adapter that process emulation commands provided by source-level debugging software operating on a host computer. The TAP includes a TAP CPU that receives target CPU input signals and delivers target CPU output signals for controlling the execution of software code by the target circuit in accordance with command signals provided by the host computer. The TAP also includes a programmable logic cell array and a RAM. The TAP logic cell array routes command and data signals to and from the TAP CPU, and the RAM stores an in-circuit emulation program used by the TAP to operate the target circuit. The adapter is physically separate from the TAP and provides an interface between the host computer and the TAP. The adapter includes a programmable logic cell array and an EPROM. The adapter logic cell array routes command and data signals to and from the adapter, and the EPROM stores the commands for configuring the signal paths within the TAP and adapter logic cell arrays and stores the TAP emulation program. A flat cable assembly provides a high-speed signal communications link between the TAP and the adapter. The TAP uses certain microprocessor signal features and source-level debugging software that runs on the host computer to provide a software engineer with a fully transparent window into the internal functioning of the TAP CPU while executing code in the target circuit environment.

U.S. Pat. No. 5,995,744 issued Nov. 30, 1999 discloses an interactive graphical software tool is provided that can be used to report the configuration data (i.e., the state of the various configuration bits) in a programmed device as well as to probe and stimulate circuits in the programmed device. A graphical or textual representation of the configuration data can be displayed. When used with a programmable device having addressable flip-flops, such as a member of the Xilinx XC6200 family, one embodiment of the invention can change the state of any addressable flip-flop in the configured device. The graphical tool of the invention is preferably implemented using a high level programming language such as Java and features a graphical point and click user interface, remote access to hardware, and symbolic debug capability. According to another aspect of the invention, data can be written into a programmable device using an interactive software tool and a hardware device designed to interface with the programmable device. The software tool can optionally access the hardware device via a network server, thereby enabling remote configuration of the programmable device.

None of the prior art describes or suggests a system for scoping of real time signals of remote communication systems and related software via a network, the system guaranteeing that scoping data packets will not exceed an allocated network bandwidth, and combating the loss of scope data packets due to "Best Effort" network transport behavior to achieve a meaningful display of real time signals in the presence of packet loss.

SUMMARY OF INVENTION

An object of the invention is a system, method and program product for scoping of real time signals of remote communication software systems via a network and using interactive bandwidth allocation limiting the aggregate bandwidth of the scoping signals to be below an allocated network bandwidth.

Another object is a system, method and program product for scoping of remote communication systems via a network and using selective block sampling or down sampling to reduce required network bandwidth for such scoping.

Another object is a system, method and program product for scoping of remote communication systems via network and combating the loss of data packets due to "Best Efforts" network transport behavior.

Another object is a system, method and program product for scoping of remote communication systems via network and using interleaving to minimize packet loss Another object is a system, method and program product for scoping of remote communication systems via a packet network and using filtering to achieve meaningful display of real-time signals in the presence of packet loss.

Another object is a system, method and program product for scoping of remote communication systems via a packet network and storing data in linked circular storage buffers.

These and other objects, features and advantages are achieved in a system, method and program product including a controller coupled to a target system via a computer network. A real time probe is installed in software executing on a target system, typically a Digital Signal Processor (DSP). The system is accessible over the computer network by a remote controller responsive to a developer issuing scoping commands and collecting scoping data. Iterative bandwidth allocation/down sampling and selective block sampling limit the aggregate network bandwidth of the scoping signal to be below an allocated bandwidth for scoping purposes. Interleaving/filtering techniques combat the loss of data packets containing scoping signals due to the "Best Effort" network transport behavior and provide meaningful display of real-time scoping signal in the presence of packet losses. The remote controller is linked to a network, typically a WAN includes a "debugger user interface" which accepts and interprets scoping commands issued by a developer. The interface sends interpreted scoping commands to a controller network driver, which constructs appropriate network packets to be sent over a network to the target system. The controller network driver also receives network packets coming from the target system containing the collected scoping data which is processed and displayed graphically on the controller by the "debugger user interface." The target system, located remotely at a customer site and linked to the WAN, has a control processor, which runs a target network driver, which receives the network packets containing the scoping commands via the network. The scoping commands are sent to an "embedded debugger" (typically resides in a DSP in the target system) which performs the requested probing/scoping. When the DSP code runs across an address where the probe was installed, the embedded debugger will collect the signal values as requested by the scoping commands. The collected scope data will be interleaved and sent to the target network driver which, will encapsulate the information into suitable packets to send back to the controller via the network. In setting up a scope command, the target system control entity validates the remote scoping request and communicates an allocated network bandwidth, which can be guaranteed using a bandwidth allocation algorithm. After scope command setup, an interactive bandwidth allocation process calculates the total aggregate network bandwidth required based on the current scope command setting. If the aggregate bandwidth is above an allocated network bandwidth, a bandwidth reduction is performed. A down sampling ratio is incremented by a constant K1 where in the preferred embodiment K1=1 for non-periodic signals or the selective sampling block rate is incremented by a constant K2 where in the preferred embodiment K2=1 for periodic signals. The new aggregate bandwidth is recalculated. The process of bandwidth allocation, down sampling, selective block sampling, is iterated until the aggregated bandwidth is within the limit of the allocated network bandwidth. The interactive bandwidth allocation is combined with an interleaving/filtering technique to minimize packet losses and formatting the received scope samples into a meaningful display. A big scope storage circular buffer at the controller first de-interleaves the data samples in order, then filters the samples when needed and transfers a block of filtered samples into a display circular storage buffer to achieve meaningful display in the event of missing scope data packets.

DESCRIPTION OF DRAWINGS

The invention will be further understood from the following description of a preferred embodiment, taken in conjunction with an appended drawing, in which.

DESCRIPTION OF PREFERRED THE EMBODIMENT

Figure 1:
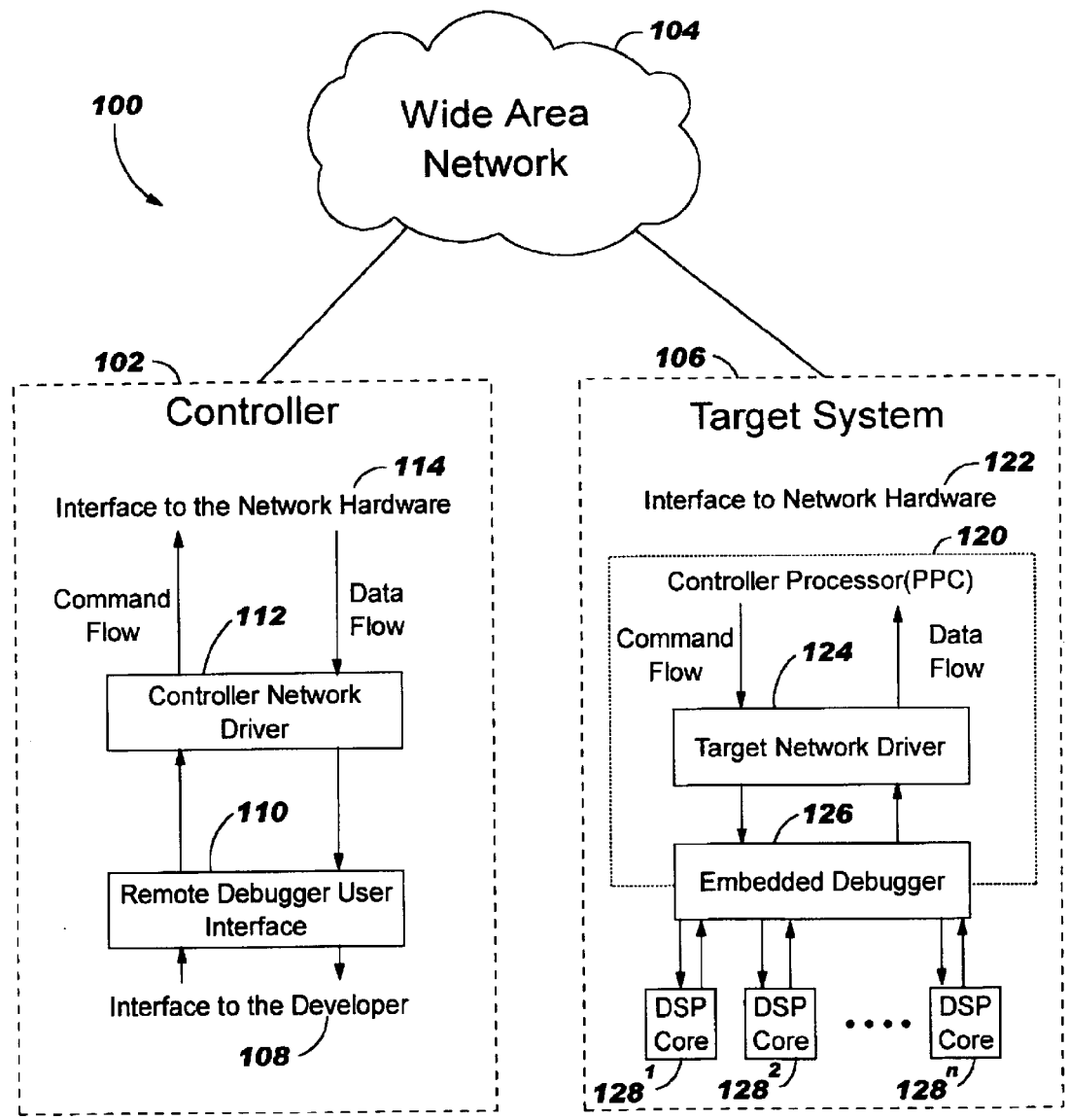
FIG. 1 is a block diagram of a computer system and network for remote scoping of a target system incorporating the principles of the present invention.

In FIG. 1, a system 100 for scoping of remote communications systems includes a controller 102, typically a PC used by a developer to issue scoping commands and to display collected scoping data. The controller is coupled to a communication network 104, typically a wide-area network, linked to a target system 106 located remotely at a customer's site, e.g., a Digital Subscriber Line (XDSL), Digital Subscriber Line Access Multiplexer (DSLAM) located at a central office for remote scoping of real-time signals in the system by the controller.

The controller includes a Graphical User Interface (GUI) 108, which accepts developer inputs and displays scoping results. The GUI accesses a debugger user interface 110, which accepts and interprets the scoping commands issued by the developer. The interface 110 sends the interpreted scoping command to a controller network driver 112 which constructs the developer commands in appropriate network packets to be sent through the network 104 to the target system 106 via a standard network interface 114. The driver 112 will also receive network packets coming from the target system, which contains the collected scoping data. The scoping data is processed by the debugger user interface 110 and is graphically displayed to the developer on the controller.

The target system includes a control processor 120 linked to the network by a standard interface 122. The processor 120 includes a target network driver 124 for receiving the commands and transmitting the scoping data. The network packets containing the scoping commands are sent to an embedded debugger 126. The debugger 126 will perform the requested probing and scoping based upon a probe installed at a code address in the DSP cores 128-1, 128-2, . . . 128-N for which scoping data is desired. The collected scoping data provided by the cores 128 are sent by the debugger 126 to the driver 124 which constructs the appropriate network packets containing the scoping data to be sent back to the controller 102.

In a preferred embodiment, Transport/transmission Control Protocol (TCP) is the selected transport protocol used to transmit the scoping commands through the network. TCP protocol can ensure that the scoping commands are conveyed to the remote target system correctly through retransmission in the event of packet loss or error. Real-Time Transport Protocol (RTP), an Internet protocol for transmitting real-time data, such as audio and video, is selected as the mechanism for sending and receiving applications to support streaming data. RTP runs on top of User Datagram Protocol (UDP), which provides for exchanges of datagrams without acknowledgements or guaranteed delivery. RTP/UDP is preferred due to the "real-time" behavior of the scoping data.

Figure 2:
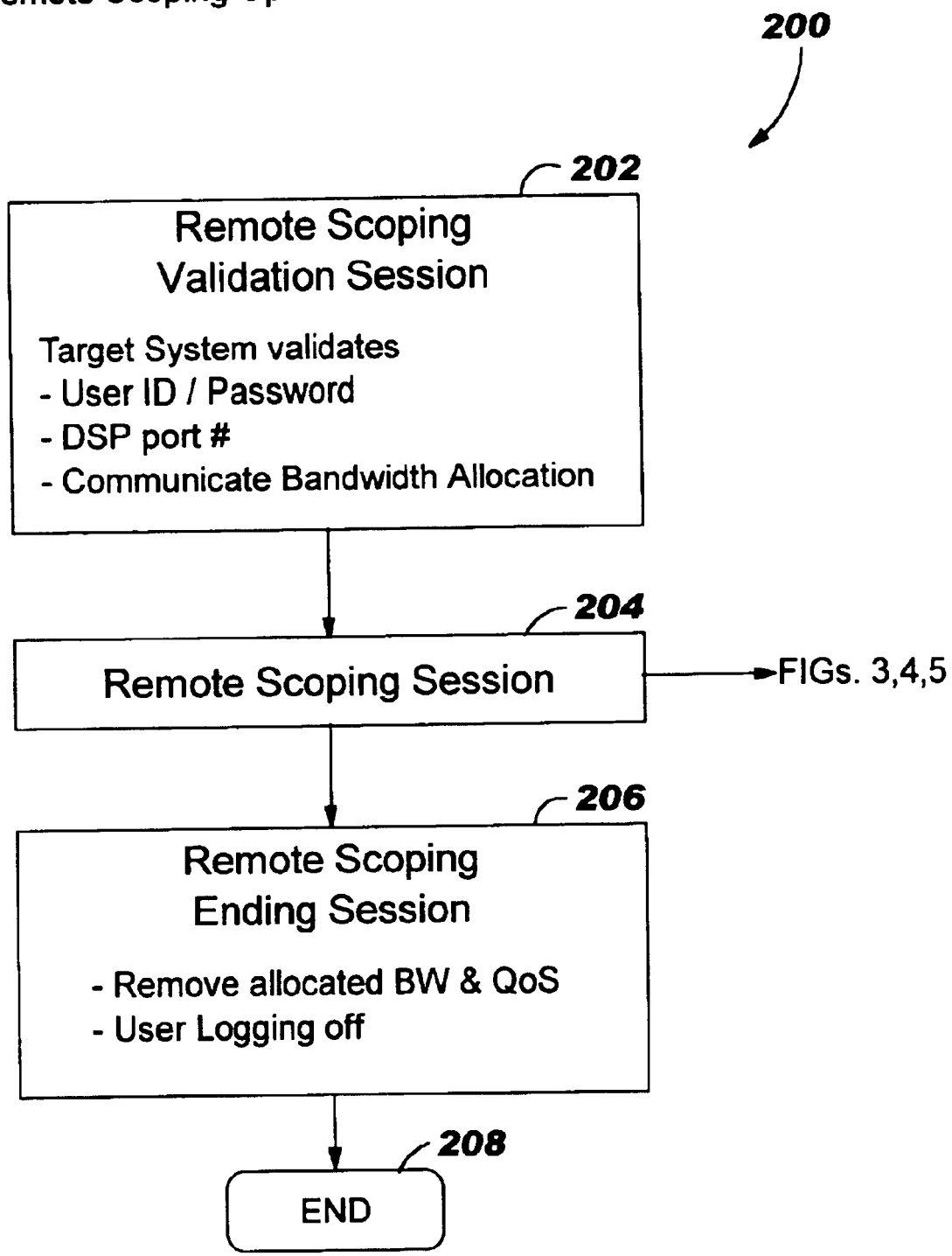
FIG. 2 is an operational flow diagram for remote scoping conducted in FIG. 1.

FIG. 2 shows a process 200 for scoping of real-time signals of remote communication systems. The process begins with a remote scoping validation session 202 in which the controller contacts an IP address for target system control entity software to initiate a validation session. The control entity software will validate the remote scoping requests by the controller by prompting for the user or developer name, password and a DSP port number or core in which the developer wishes to conduct signal probing. The control entity will communicate to the controller an allocated network bandwidth, as will be described hereinafter.

In an alternative embodiment, in the case of central office equipment such as XDSL, DSLAM, a System Administrator can set an allocated network bandwidth and select a Quality of Service (QoS) level for the remote scoping function. By applying the algorithms described in related application, Ser. No. 09/906,485 entitled "Bandwidth Allocation of Speech Codec," filed Jul. 16, 2001 (RAL92000-0103US1/1963-7414), an allocated bandwidth and QoS level can be guaranteed for the real-time scoping data packets at the edge of a broadband network.

After validation, a remote scoping session 204 is conducted as will be described in conjunction with FIGS. 3, 4 and 5. When the developer wishes to terminate the scoping sessions, the controller will start a remote ending session 206 which will be described in conjunction with FIG. 4 and communicate to the target remote control entity software to remove the allocated bandwidth and QoS for the scoping session, after which the operation is completed for scoping of real-time systems of remote communication systems.

Figure 3:
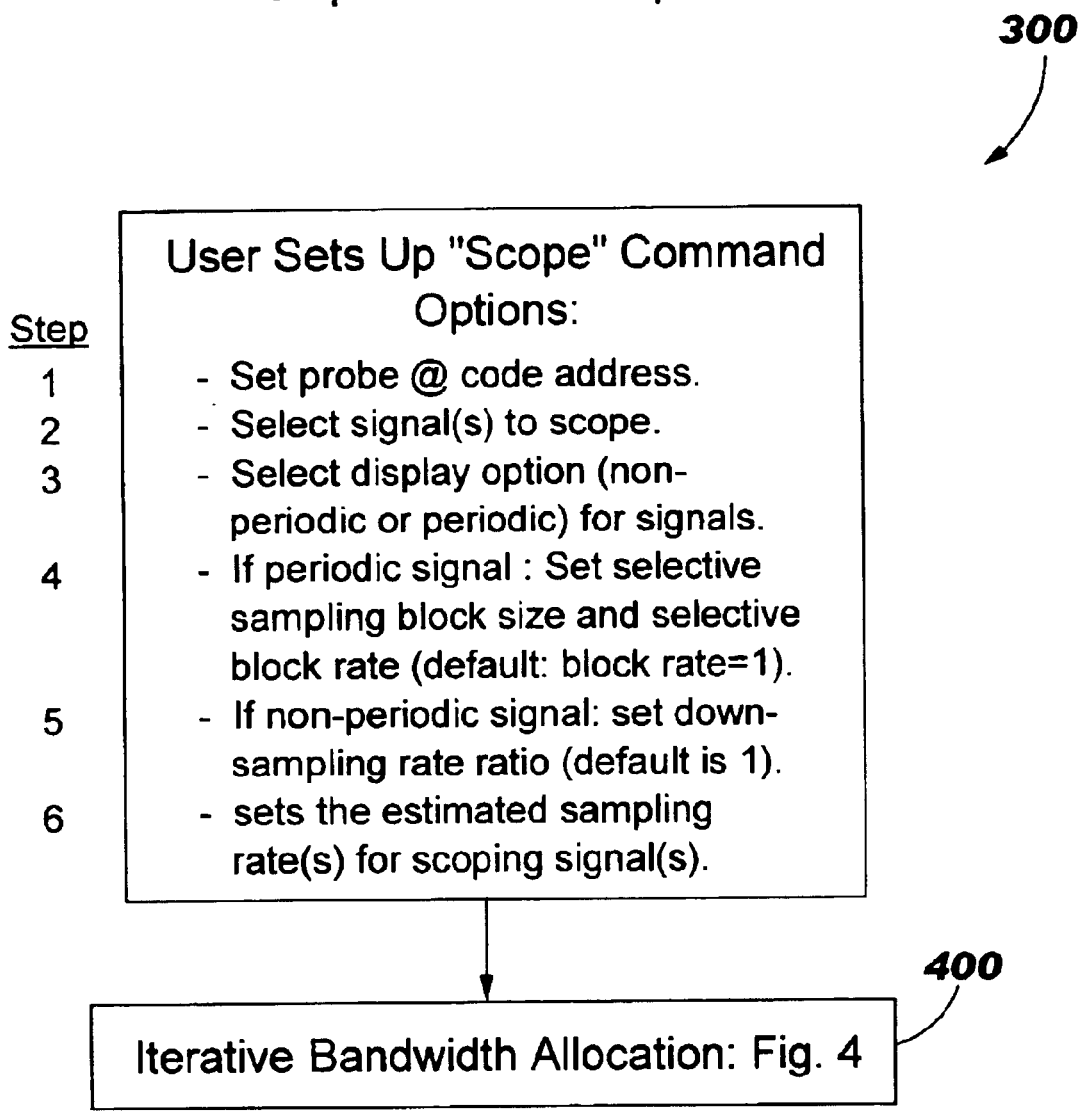
FIG. 3 is a flow diagram of a command setup for remote real time scoping session conducted in FIG. 1.

In FIG. 3, a scope command set up block 300 enables a developer to set a probe(s) at a code address in the DSP core 128-1 . . . 128-N, for collecting real-time signals to be analyzed. In step 2, the developer selects the signals to be analyzed. In step 3, the developer selects the display option for the collected signals. In Step 4, the display option may be or Periodic or Non-Periodic. In Periodic, a selective sampling block size and selective block rate are set where Default=Block Rate=1. In step 5, if the display option is Non-Periodic, a Down Sampling Ratio is set where Default is 1. In step 6, the estimated sampling rate for the scoping signals is set.

Figure 4:
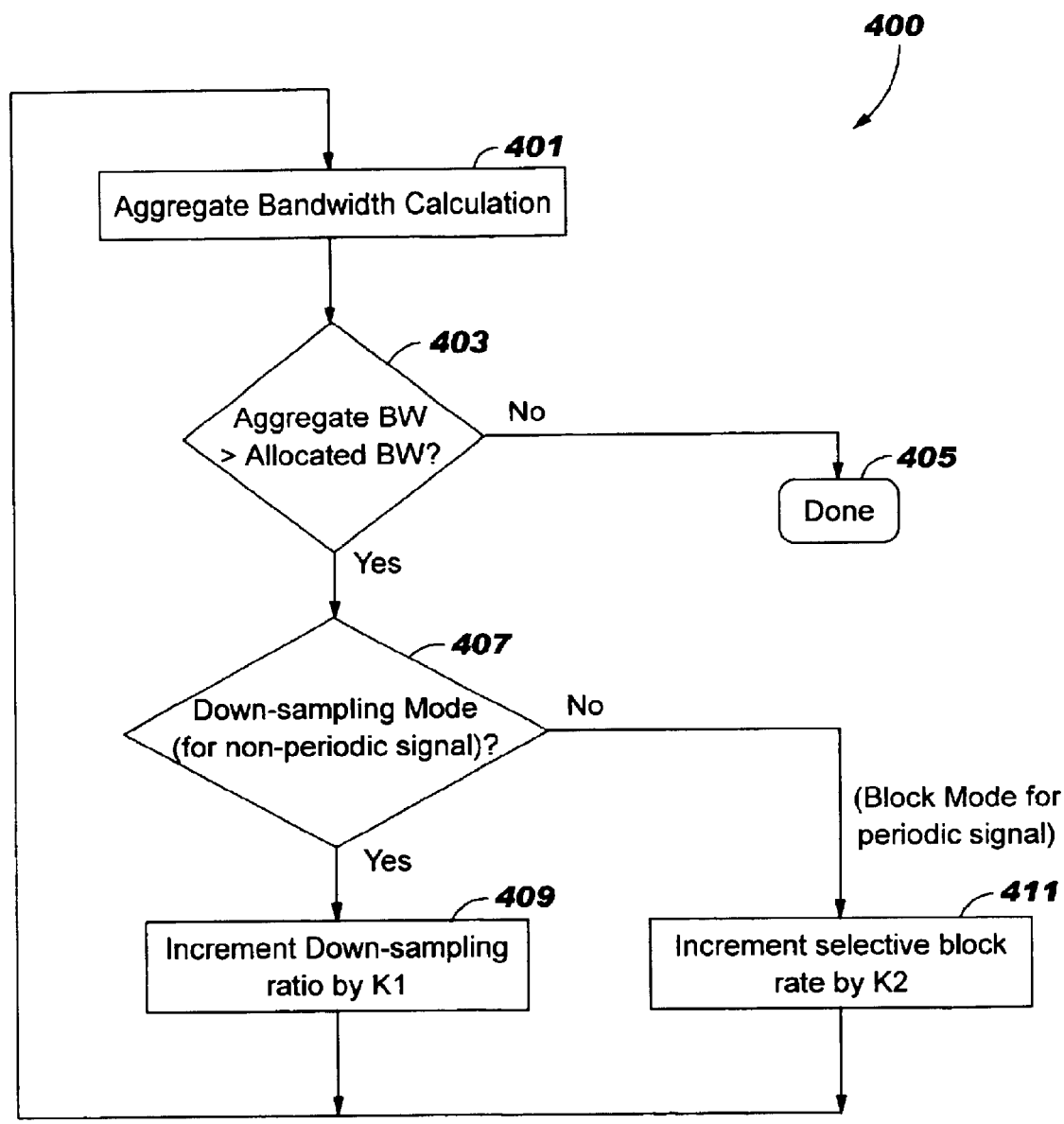
FIG. 4 is a flow diagram of iterative bandwidth allocation/down-sampling and selective block sampling conducted by a controller system to guarantee that scoping data packets will not be lost due to "Best Efforts" network transport behavior in FIG. 1.

In FIG. 4, a process 400 executed by the controller calculates the aggregated bandwidth for the command setting to be within the limits of an allocated network bandwidth provided by the target system. In block 401, the controller calculates the total aggregated network bandwidth required based on the current scope command setting. In block 403 a test is conducted to determine whether the aggregated bandwidth is greater than the allocated bandwidth. A "no" condition ends the process in block 405. If the aggregate bandwidth is above the allocated bandwidth, a "yes" condition transfers the process to block 407 to initiate a bandwidth reduction. In block 407, non-periodic display option is selected. A down-sampling ratio is incremented in block 409 by a constant K1 where in the preferred embodiment K1=1. If a periodic display option is selected, the selective sampling block rate is incremented by a constant K2 where in the preferred embodiment K2=1. In block 411 the new aggregate bandwidth is recalculated by returning to block 401 and the process continued until the aggregate bandwidth is less than the allocated bandwidth, after which the process ends in block 405. The interactive bandwidth allocation process 400 is combined with a bandwidth allocation/QoS algorithm described in related application, Ser. No. 09/906,485 entitled "Bandwidth Allocation of Speech Codec, filed Jul. 16, 2001. supra. The process 400 and the related application guarantee that the scoping data packets will not be tossed away by the network edge due to bandwidth over-subscription. The interactive bandwidth allocation enables probing of high data rates. For example, the received signal for "full rate" ADSL. At a sampling rate of 2.208 MHz. a 16-bit sample, the aggregated network bandwidth will be over 36 Mbps. In the case of such high bandwidth scoping data, the interactive bandwidth allocation process will allow real-time scoping of either the decimated signal or the transitional behavior of the signal in the selective blocks.

Figure 5:
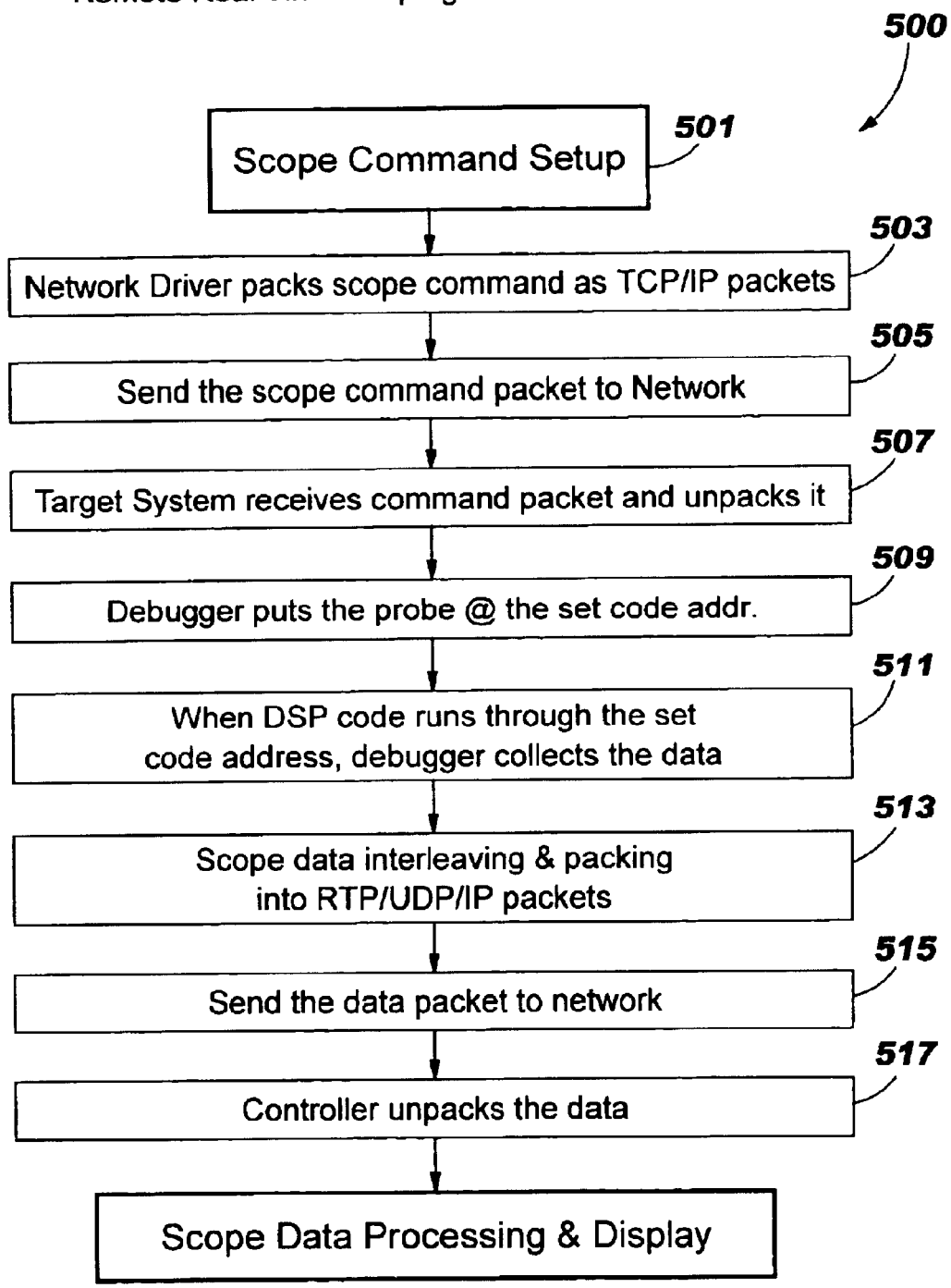
FIG. 5 is a flow diagram of a remote real-time scoping session conducted in FIG. 1

In FIG. 5, a process 500 is shown for scoping of real-time signals at remote communication systems. After a scope command set up (see FIG. 3) in block 501, a controller driver 112 packs the scope command as TCP/IP packets in block 503. The TCP/IP packets concatenating the scope commands are transmitted to the target system network via the network 104 in block 505. The target network driver, receives the scoping command packet, strips off the header, and passes the scoping command information to the embedded debugger 126 in block 507. The debugger installs the probe at the specified code address in block 509. In block 511 when the DSP code runs through the probe at the set code address, the debugger will collect the signal values as requested by the scoping command. The signal values will be transmitted to the target network driver, which will interleave and pack the signals into RTP/UDP/IP packets in block 513. The target network driver will transmit the data packets to the network in block 515. The controller network driver will receive and unpack the data packets in block 517, and provide the data to the controller debugger interface. The packets will be processed and displayed on a screen for viewing by the developer. The storage of the packets for display purposes in the controller will be described hereinafter in conjunction with FIG. 7.

Figure 6:
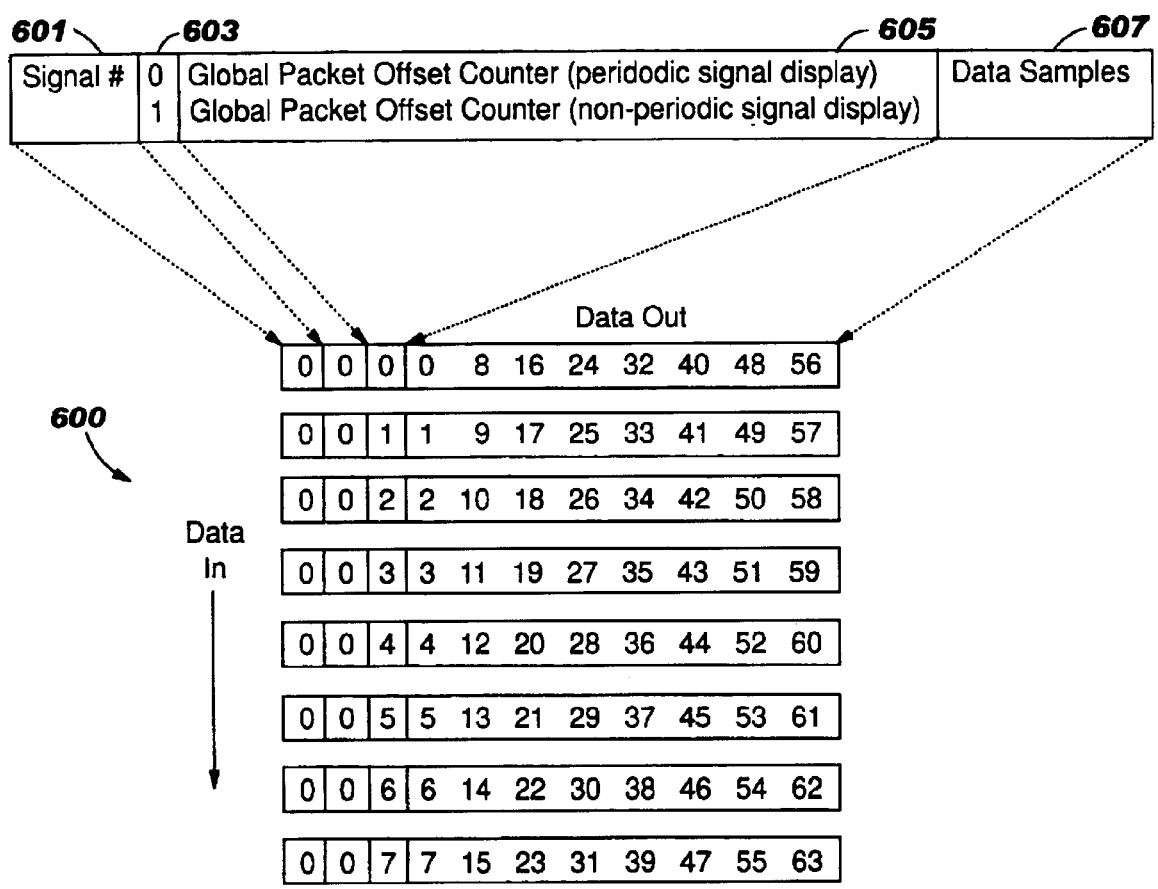
FIG. 6 is a representation of an interleaver structure for minimizing packet loss for display purposes in FIG. 1.

In FIG. 6, an interleaver structure 600 minimizes the impact of packet loss in RTP/UDP/IP packets used to transport the real-time scope data. The number of data samples a RTP/UDP/IP packet carries is a design parameter, which may vary from one implementation to the next. The design parameter can be related to how much memory a real system has available for storing data prior to transmission. For purposes of description, it will be assumed that each RTP/UDP/IP packet will carry 8 data samples for one signal being probed. If there are multiple signals to be probed, different packets will carry 8 samples for each different signal. For purposes of description, it is assumed that only one signal is being probed. Under this assumption, the first data packet will carry samples 0–7, a second packet 8–15, etc. If the network discards a data packet, 8 consecutive sample blocks would be missing. The more samples a RTP/UDP/IP packet carries, the longer the missing block will be, the more the impact will be on the formatting and processing to achieve a meaningful display.

In FIG. 6, the interleaver includes a column 601 identifying a signal number; a column 603 identifying a periodic signal display by the character 0 or identifying a non-periodic signal display by the character 1; a column 605 which counts the periodic signal display or non-periodic signal display according to column 603; and a column 607 in which the data samples are stored on a vertical basis and read out on a horizontal basis. The samples contained in each packet are 8 samples apart from each other. When the network due to "best efforts" transmission policy discards a data packet, only one sample will be missing in every 8 samples. Thus, the interleaver facilitates the controller in filtering out the effects of missing samples as will be described in conjunction with FIGS. 7 and 8.

Figure 7:
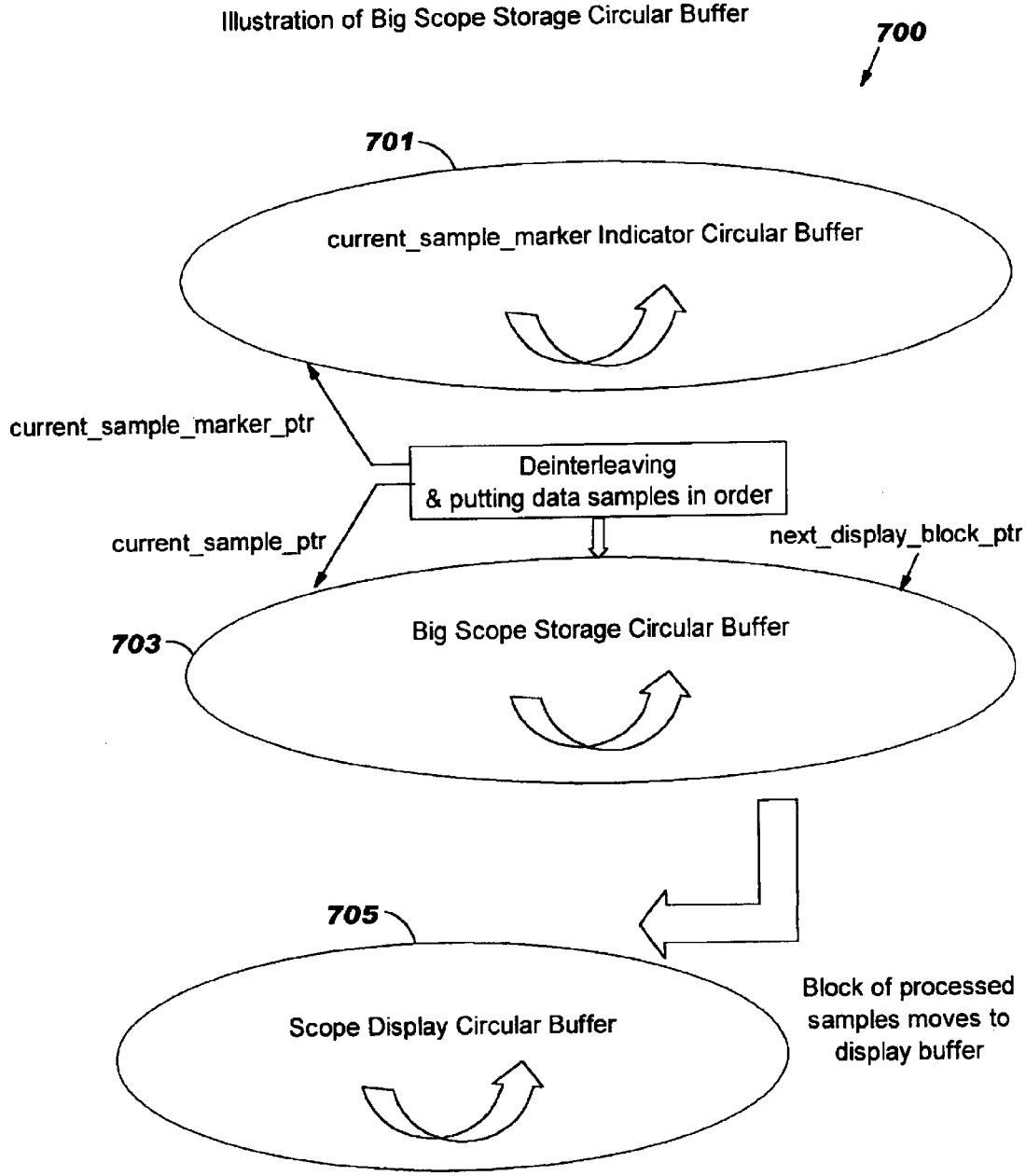
FIG. 7 is a representation of a Big Scope Storage Circular Buffer in the computer system of FIG. 1.

In FIG. 7, a big scope storage circular buffer 700 comprises several linked circular buffers 701, 703 and 705 for processing the data samples for display to the developer. A big storage circular buffer 703 deinterleaves and aligns the samples in order taken by the embedded debugger 126 (FIG. 1). A buffer 701 with only one bit in each location is used to hold an indicator bit called "current_sample_marker" for each corresponding sample in the bit storage circular buffer. Before every scoping session, the buffer 701 is initialized to all zeros. The buffer 703 maintains three pointers (ptr): a current_sample_ptr; a cuurent_sample_marker_ptr, and a next_display_block_ptr When a received sample is written into buffer 703, the corresponding bit is set into buffer 701. After a block of samples have been processed and moved from buffer 703 to a scope display circular buffer 705, the corresponding blocks of bits in buffer 701 will be reset so that buffer 703 will be ready to receive a new block of samples for processing. Samples in the buffer 703 are not directly viewable to the developer or user since there may be lost samples (due to packet loss) or out of order samples (due to the fact that the network packets may arrive out of order). When a block of processed samples, pointed to by the next_display_block_ptr, becomes available from the buffer 703, it will be read into the buffer 705. The buffer 705 holds the samples viewable to the developer or user. Data processing for display purposes is performed and will be described in conjunction with FIG. 8.

Figure 8:
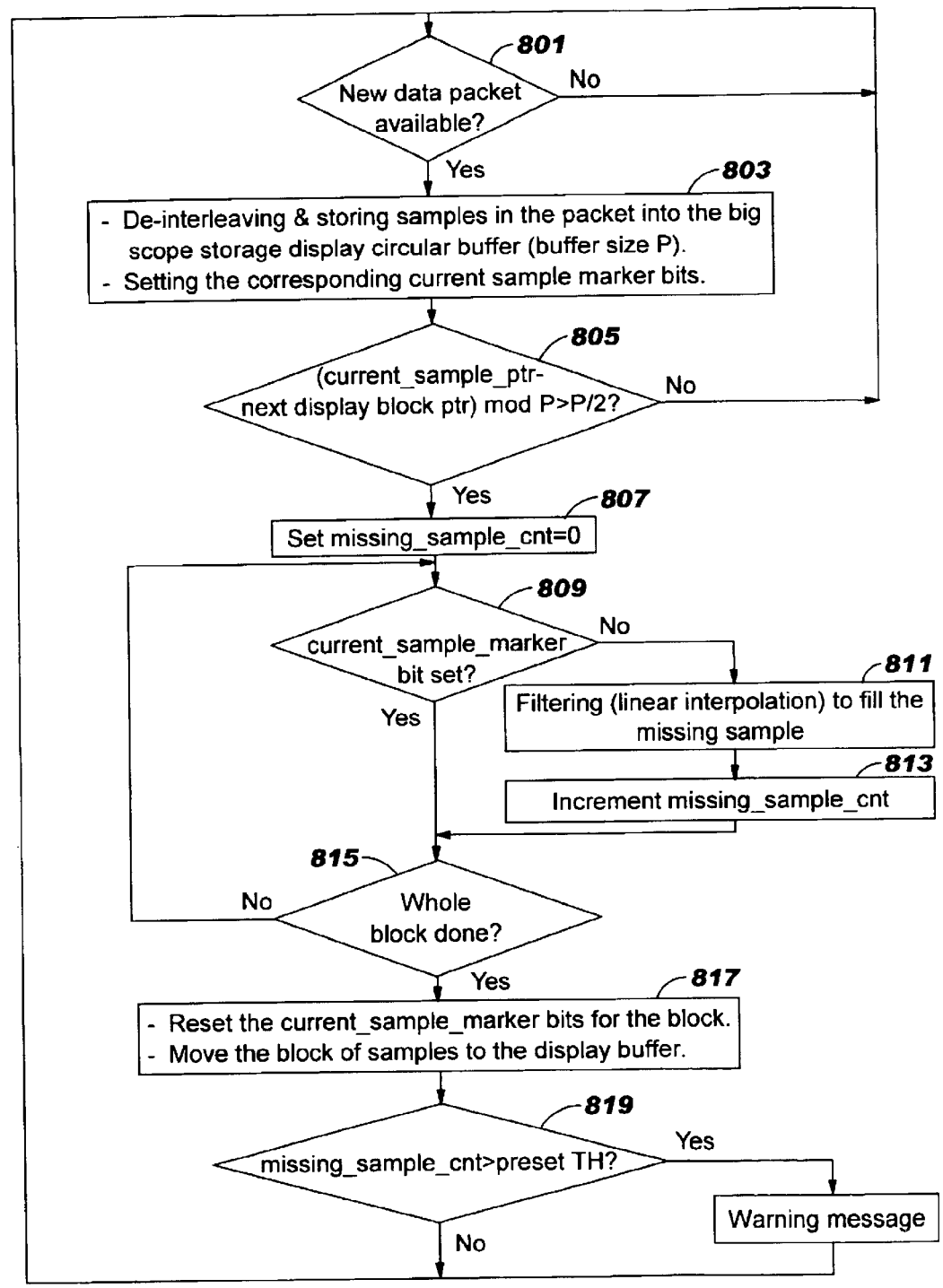
FIG. 8 is flow diagram of scope data processing and display in the controller of FIG. 1.

In FIG. 8, the purpose of the scoped data processing is to perform proper filtering of the data so as to achieve meaningful display in the event of missing scoped data packets. FIG. 8, shows a process 800 for scoped data processing and display and will be described in conjunction with FIG. 7. A global packet offset counter 605 (see FIG. 6) is set at Time (T) where in the preferred embodiment T=0, the counter being incremented by the embedded debugger 126 for each data packet in a scoped signal. The counter contents are carried in each data packet as shown in Column 605. The counter indicates which "L" samples (L) (L=8 was the number used in FIGS. 5 & 6) in the big storage circular buffer 703 are to be replaced by newly arrived samples in the packet. In block 801, a test is performed to determine whether a new data packet is available. A "no" condition returns the process to a "waiting" state. A "yes" condition initiates block 803 in which the "L" data samples are de-interleaved and stored in the big scope storage display circular buffer 703. The corresponding current_sample_marker bits in buffer 701 are set. In block 805, a current_sample_ptr is calculated for de-interleaving and storing the Ith sample in the packet (i=0, 1 . . . L−1) into the circular buffer 703. The following equation is used for calculating the current_sample_ptr:

$$\text{current\_sample\_ptr} = \text{mod}\left(\left(\left\lfloor \frac{\text{offset}}{L} \right\rfloor \times L^2 + \text{mod}(\text{offset}, L) + i \times L\right), P\right)$$

where $\lfloor \ \rfloor$ is the flooring operation, mod(x, y)=x mod y, e.g., mod(6,5)=1, mod(4,5)=4.

and the big scope storage buffer 703 is of size P and offset is the global packet offset counter 605 carried in the packet. After samples in the newly received data packet are stored in the buffer, a check is made to determine whether it is time to move a block of samples into the display buffer 705 where the samples are viewable to the user.

A pointer called next_display_block_ptr points to the address of the next display block to be moved after comparison with the current_sample_ptr in block 805 and satisfying the following equation:

$$\text{mod}((\text{current\_sample\_ptr}-\text{next\_display\_block\_ptr}),P)>(P/2)$$

If the current_sample_ptr and the next_display_block_ptr separation is not greater than P/2, the process returns to block 801 and waits for the next packet. If the current_sample_ptr and the next_display_block_ptr is greater than P/2, a missing sample counter is set to zero in block 807. In block 809, a test is made to determine if the current_sample_marker bit is set. If a "no" condition is set, an operation 811 is performed to fill the missing sample by linear interpolation and the missing sample counter is incremented in block 813. With the current-sample_marker bit set, a test is performed in block 815 to determine if a whole block of samples has been processed. A "no" condition returns the process to block 809. A "yes" condition updates the next_display_block_ptr to point to the starting address for the next data block and the process samples are moved to the display buffer 705 in block 817. The missing_sample_counter (cnt) is compared to a pre-set threshold in block 819 and if greater than the threshold, a warning message is sent to the user in block 821 notifying the user that too many samples are missing. Otherwise, the process returns to block 801 for the next data packet for processing.

Where the samples have been replaced in a block, the interpolated or substitute sample is marked with a different color so that the user is aware that the sample has been replaced due to packet loss. If the user continues to receive warning messages for processing sample blocks, than the user may consider reducing the sampling rate by following process 400 described in FIG. 4.

While the invention has been shown and described in a preferred embodiment, various changes can be made without departing from the spirit and scope of the invention as defined in the appended claims,

We claim:

1. System for remote scoping of real time signals of software systems via a network using interactive bandwidth allocation and data signals, comprising:
   a controller coupled to the network accessible by a developer for generating a scoping command and collecting remote scoping data, the controller including a debugger user interface responsive to the developer for interpreting developer scoping commands and transmitting the commands to a controller network driver which constructs appropriate network packets to be sent through the network;
   a target system coupled to the network and including a target network driver which receives the network packets containing the scoping commands and transmits the collected scoping data from the target system;
   an embedded debugger coupled to the target network driver for executing the controller scoping command and collecting the scoping data for transmission to the target network driver which constructs appropriate network packets to be sent via the network to the controller and display to the developer; and
   interactive bandwidth allocation software in the target system for guaranteeing that scoping data packets will not exceed the allocated network bandwidth wherein the interactive bandwidth allocation software further comprises: down-sampling and selective sampling.

2. The system of claim 1 further comprising:
   filtering software for combating the loss of scope data packets due to "Best Effort" network transport behavior.

3. The system of claim 1 further comprising:
   interleaving software for combating the loss of scope data packets due to "Best Effort" network transport behavior.

4. The system of claim 1 further comprising:
   a storage circular buffer at the target system for de interleaving and filtering the scope data to achieve meaningful display of collected scope data in the event of missing scope data packets.

5. The system of claim 1 further comprising:
   a selected transport protocol used to transmit scoping commands through the network and enabling retransmission of packets in the event of packet loss or error.

6. The system of claim 1 further comprising:
   a transport protocol for transmitting collected scoping data from the target system through the network and providing real time behavior of the scoping data.

7. System for remote scoping of real time signals of software systems via a network using interactive bandwidth allocation and data signals, comprising:
   a controller coupled to the network accessible by a developer for generating a scoping command and collecting remote scoping data, the controller including a debugger user interface responsive to the developer for interpreting developer scoping commands and transmitting the commands to a controller network driver which constructs appropriate network packets to he sent through the network;
   a target system coupled to the network and including a target network driver which receives the network packets containing the scoping commands and transmits the collected scoping data from the target system;
   an embedded debugger coupled to the target network driver for executing the controller scoping command and collecting the scoping data for transmission to the target network driver which constructs appropriate network packets to be sent via the network to the controller and display to the developer;
   interactive bandwidth allocation software in the target system for guaranteeing that scoping data packets will not exceed the allocated network bandwidth; and
   target control entity software which validates a remote scoping request and communicates to the controller an allocated network bandwidth.

8. The system of claim 7 wherein the interactive bandwidth allocation apparatus sets the probing code address; selects the signals to probe; selects non-periodic or periodic sampling operation, sets the selective display block rate if periodic display is chosen; and sets a down sampling ratio if non-periodic display option is selected.

9. The system of claim 7 further comprising:
   remote real-time scoping session apparatus, which constructs transmit scoping command packets to the target system for installation in the target software.

10. System for remote scoping of real time signals of software systems via a network using interactive bandwidth allocation and data signals, comprising:
    a controller coupled to the network accessible by a developer for generating a scoping command and collecting remote scoping data, the controller including a debugger user interface responsive to the developer for interpreting developer scoping commands and transmitting the commands to a controller network driver which constructs appropriate network packets to be sent through the network;
    a target system coupled to the network and including a target network driver which receives the network packets containing the scoping commands and transmits the collected scoping data from the target system;

an embedded debugger coupled to the target network driver for executing the controller scoping command and collecting the scoping data for transmission to the target network driver which constructs appropriate network packets to be sent via the network to the controller and display to the developer;

interactive bandwidth allocation software in the target system for guaranteeing that scoping data packets will not exceed the allocated network bandwidth; and interleaved/filtering apparatus which stores test data sample in columns in a buffer and read out from the buffer in a row direction.

11. The system of claim 10 wherein the a circular storage buffer for holding incoming scope samples at the controller comprises a de-interleaving buffer; a next display block; a display block and an indicator bit as a marker for each corresponding sample in the storage circular buffer.

12. The system of claim 11 wherein the de-interleaving display circular buffer calculates a current sample pointer for de-interleaving and storing the "ith" sample in the scope data packet.

13. A method for remote scoping of real-time signals of software systems via a network using interactive bandwidth allocation and data signals, comprising the steps of:

accepting and interpreting scoping commands for remote software in a target system issued by a developer;

sending the interpreted scoping commands to a controller network driver, which constructs appropriate network packets to be sent through the network;

receiving the network packets containing scoping commands from the network at a target network driver;

performing the requested probing on the target software system using command probe signals;

collecting the scoping data for transmission to the target network driver;

constructing the appropriate network packets to be sent through the network back to the controller;

validating a user ID/password; test software port number and communication bandwidth allocation;

removing an allocated bandwidth and Quality of Service (QoS) level for the command probe signals; and logging off the user.

14. The method of claim 13 further comprising the step of:

selecting a transport protocol to transmit scoping commands through the network to target software.

15. The method of claim 13 further comprising the step of:

selecting transport protocol for transmitting collected scoping data through the network to the controller.

16. A method of remote scoping of real-time signal of software systems, comprising the steps of:

issuing scope commands at a controller as TCP/IP packets for transmission to target software;

providing at the target system an aggregated bandwidth within an allocated bandwidth to the controller for transmitting the scope data;

interactive bandwidth allocation for limiting the aggregated bandwidth of the scope data to be within the allocated bandwidth;

transmitting the scope command as packets to the network;

receiving the command packets and unpacking them at the target software;

installing in a probe the scope command at a set code address in the target software;

collecting the scoping data when the software runs through the set code address;

interleaving and packing the scope data into RTP/UDP/IP packets;

transmitting the scope data packets to the controller via the network;

unpacking the scope data from the network.

17. The method of claim 16 further comprising the step of:

de-interleaving and filtering the unpacked scope data for display.

18. A program medium, executable on a computer system, for remote scoping of real-time signals of software systems via network using interactive bandwidth allocation and data signals comprising:

program instructions accepting and interpreting scoping commands for remote software in a target system issued by a developer;

program instructions sending the interpreting scoping commands to a controller network driver, which constructs appropriate network packets to be send through the network program instructions providing at the target system an allocated bandwidth to the controller network driver for transmitting the scope data;

program instructions receiving the network packets containing scoping commands from the network at a target network driver;

program instructions performing the requested probing on the target software system; and program instructions collecting the scoping data for transmission to the target network driver.

19. The medium of claim 18 further comprising program instructions constructing the appropriate network packets to be sent through the network back to the controller.

20. The medium of claim 18 further comprising:

program instructions selecting a transport protocol to transmit scoping commands through the network to target software.

21. The medium of claim 18 further comprising:

program instruction selecting transport protocol for transmitting collected scoping data though the network to the controller.

22. The medium of claim 18 further comprising:

program instructions validating a user ID/password;

test software port number and communication bandwidth allocation removing the allocated bandwidth and Quality of Service (QoS) level for the command probe signals, and logging off the user.

23. The medium of claim 18 comprising program instructions issuing scope commands at a controller as TCP/IP packets for transmission to target software.

24. The medium of claim 18 further comprising:

program instructions providing interactive bandwidth allocation for limiting the bandwidth of the scope data to be within the allocated bandwidth.

25. The medium of claim 18 further comprising:

program instructions transmitting the scope command as packets in the interactive bandwidth allocation to the network.

26. The medium of claim 18 further comprising:

program instructions receiving the command packets and unpacking them at the target software, 27. The medium of claim 18 further comprising:
program instructions installing the scope command at a set code address in the target software.

28. The medium of claim 18 further comprising:
program instructions collecting the scoping data when the software runs through the set code address.

29. The medium of claim 18 further comprising:
program instructions interleaving and packing the scope da into RTP/UDP/IP packets.

30. The medium of claim 18 further comprising:
program instructions transmitting the data packets to the controller via the network.

31. The medium of claim 18 further comprising:
program instructions unpacking the scope data from the network.

32. The medium of claim 18 further comprising:
program instructions de-interleaving and filtering the unpacked scope data for display.

33. A method for remote scoping of real-time signals of remote software, comprising the steps of:

generating scoping commands issued by a developer for real time analysis of software in a remote target system;

sending the scoping commands to a controller network driver, which constructs appropriate network packets to be sent through a network;

receiving the network packets containing scoping commands at the remote target system.

installing a probe in the remote target system;

performing probing of the software using the probe and collecting real time signals as the software is executed by the remote target system constructing return network packets containing the real time signals for transmission via the network to the controller network driver;

minimizing packet loss in the transmission of the return network packets to the controller network driver; and analyzing the real time signals in the return network packets by the developer.

* * * * *